US008761525B2

(12) United States Patent
Singh et al.

(10) Patent No.: US 8,761,525 B2
(45) Date of Patent: Jun. 24, 2014

(54) METHOD AND SYSTEM FOR COMPRESSIVE COLOR IMAGE SAMPLING AND RECONSTRUCTION

(76) Inventors: Tripurari Singh, Seattle, WA (US); Mritunjay Singh, Irvine, CA (US)

( * ) Notice: Subject to any disclaimer, the term of this patent is extended or adjusted under 35 U.S.C. 154(b) by 481 days.

(21) Appl. No.: 12/951,043

(22) Filed: Nov. 20, 2010

(65) Prior Publication Data

US 2011/0142339 A1    Jun. 16, 2011

Related U.S. Application Data

(60) Provisional application No. 61/262,923, filed on Nov. 20, 2009.

(51) Int. Cl.
*G06K 9/36* (2006.01)
(52) U.S. Cl.
USPC .......................... 382/232; 382/276; 382/166
(58) Field of Classification Search
USPC ......................................... 382/166, 232, 276
See application file for complete search history.

(56) References Cited

U.S. PATENT DOCUMENTS

| | | | | |
|---|---|---|---|---|
| 5,751,243 | A * | 5/1998 | Turpin | 342/179 |
| 7,283,231 | B2 | 10/2007 | Brady | |
| 7,532,772 | B2 | 5/2009 | Brady | |
| 7,928,893 | B2 * | 4/2011 | Baraniuk et al. | 342/25 F |
| 2003/0197796 | A1 | 10/2003 | Taubman | |
| 2006/0239336 | A1 | 10/2006 | Braraniuk et al. | |
| 2007/0040828 | A1 | 2/2007 | Zalevsky et al. | |
| 2007/0268391 | A1 * | 11/2007 | Kuroiwa | 348/333.01 |
| 2008/0025624 | A1 * | 1/2008 | Brady | 382/238 |
| 2009/0220125 | A1 | 9/2009 | Ren et al. | |
| 2010/0103309 | A1 * | 4/2010 | Stern | 348/360 |
| 2011/0090371 | A1 * | 4/2011 | Cote et al. | 348/237 |

OTHER PUBLICATIONS

Gan, Lu. "Block compressed sensing of natural images." Digital Signal Processing, 2007 15th International Conference on. IEEE, 2007.*
Figueiredo, Gradient Projection for Sparse Reconstruction: Application to Compressed Sensing and Other Inverse Problems, IEEE J. Signal Processing 2007, pp. 1-12.
Brualdi, The Sparse Basis Problem and Multilinear Algebra, Apr. 1992, rev 1993, Univ of Minnesota, Inst. for Mathematics, pp. 1-25.
Candes, Robust Uncertainty Principles: Exact Signal Reconstruction . . . , Jun. 2004, rev Aug. 2005, Caltech Applied and Comp Mathematics & UCLA Dept of Mathematics, pp. 1-41.

(Continued)

*Primary Examiner* — Michelle Entezari

(57) ABSTRACT

A method and system for compressive color image sampling and reconstruction. A sample set of data generated by transforming and sampling an optical property of an original image in a spatial basis, wherein the transformation effected is substantially diagonal in the spatial basis is received. A compressive sensing reconstruction technique is applied to the sample data to produce a set of inferred original image data. A data processing apparatus is adapted to receive such a sample set of data and apply a compressive sensing reconstruction technique to the sample data to produce a set of inferred original image data. In a preferred embodiment a imaging system uses a color filter array (CFA) wherein colors are randomly or pseudo-randomly arranged over an image sensor. The image is inferred from the sensor data and the CFA pattern using compressive sensing sparse solution search techniques. The inferred image has greater resolution than achievable through current CFA based schemes using a sensor with an identical number of sensor elements.

28 Claims, 5 Drawing Sheets

(56) References Cited

OTHER PUBLICATIONS

Wakin, An Architecture for Compressive Imaging, Rice Univ. Dept of Elec & Comp Eng'g, pp. 1-4.

Candes, Sparsity and Incoherence in Compressive Sampling, Nov. 30, 2006, CalTech Applied and Comp Mathematics & UCLA Dept of Mathematics, pp. 1-20.

Nagesh, Compressive Imaging of Color Images, Arizona State Univ, Dept of Comp Sci & Eng'g, 2009.

Candes, Practical Signal Recovery from Random Projections, Jan. 25, 2005, draft paper, pp. 1-17.

Condat, Random Patterns for Color Filter Arrays with Good Spectral Properties, Research Report, Helmoltz Zentrum, Munich, Jun. 2008, pp. 1-6.

Holtz, An Introduction to Compressive Sensing PPT, Jan. 2009, Stanford, pp. 1-27.

\* cited by examiner

```
CFA = zeros(3*m, n);
rnd = randn(m, n);
for i=1: m
   for j=1: n
      if rnd(i, j) < -0.4307
         CFA(i, j) = 1;
      else if rnd(i, j) < 0.4307
            CFA(m+i, j) = 1;
         else
            CFA(m+m+i, j) = 1;
         end
      end
   end
end R = @(x) CFA.*x;
RT = @(x) CFA.*x;

W = @(x) [idct2(x(1:m,:)); idct2(x(m+1:2*m,:)); idct2(x(2*m+1:3*m,:))];
WT = @(x) [dct2(x(1:m,:)); dct2(x(m+1:2*m,:)); dct2(x(2*m+1:3*m,:))];

A = @(x) R(W(x));
AT = @(x) WT(RT(x));

sigma = 1;
y = R([f(:,:,1); f(:,:,2); f(:,:,3)]) + sigma*randn(size(f));

tau = .3;
tolA = 2.e-4;
```

FIG. 5

METHOD AND SYSTEM FOR COMPRESSIVE COLOR IMAGE SAMPLING AND RECONSTRUCTION

RELATED APPLICATIONS

This application is based on and claims the benefit of priority of U.S. Provisional Application No. 61/262,923, filed Nov. 20, 2009, which is hereby incorporated by reference in its entirety.

BACKGROUND OF THE INVENTION

1. Field of the Invention

Embodiments of the present invention relate to systems and methods for compressive sampling in imaging.

2. Background Information

Conventional Sampling

Digital signal analysis requires conversion of analog signals into the discrete domain as a first step. This is governed by sampling theory which conventionally dictates that analog signals must be sampled at or above the Nyquist rate, which can be defined as twice the highest frequency component of the analog signal. For high bandwidth signals correspondingly high sampling rates can place a heavy load on the acquisition system.

Conventional Color Imaging

Images herein can be considered analog signals whose amplitude may represent some optical property such as intensity, color and polarization which may vary spatially but not significantly temporally during the relevant measurement period. In color imaging, Light intensity typically is detected by photosensitive sensor elements. Conventional image sensors are typically composed of a two dimensional regular tiling of these individual sensor elements. Color imaging systems need to sample the image in at least three basic colors to synthesize a color image. We use the term "basic colors" to refer to primary colors, secondary colors or any suitably selected set of colors that form the color space in which the imaging system represents the image. Color sensing may be achieved by a variety of means such as, for example, (a) splitting the image into three identical copies, separately filtering each into the basic colors, and sensing each of them using separate image sensors, or (b) using a rotating filter disk to transmit images filtered in each of the basic colors in turn onto the same image sensor.

However, the most popular design for capturing color images is to use a single sensor overlaid with a color filter array ("CFA"). This includes the straightforward design wherein the value of each output pixel is determined by three sensing elements, one for each basic color, usually arranged in horizontal or vertical stripes.

Other CFA designs, including the popular one described in Bayer, U.S. Pat. No. 3,971,065 entitled COLOR IMAGING ARRAY, use filters of different colors arranged mostly in regular, repeating patterns. All of these systems rely on a process called demosaicing, aka demosaicking, to reconstruct the three basic colors at each pixel location. Conventional demosaicing algorithms typically involve the use of, for example, interpolation techniques such as bilinear, demodulation and filtering and edge adaptive algorithms. Conventional demosaicing algorithms work well only if the high frequencies, corresponding to the fine detail, of images in the basic colors are correlated or have low high frequency energy content in at least one direction. In the absence of these high frequency characteristics, reconstructed images exhibit artifacts. Random CFAs have also been studied in Condat, "Random patterns for color filter arrays with good spectral properties" (Research Report of the IBB, Helmholtz Zentrum Munchen, no. 08-25, September 2008, Munich, Germany), but the reconstruction therein also relies on conventional demosaicing. As such the reconstructed images exhibit demosaicing artifacts except they are rendered visually less objectionable by randomization.

Signal Compression

Image compression is typically applied after digital image acquisition to enable reduction of the system data load during transmission and storage. Image compression is based on the observation that natural images and many synthetic ones are approximately sparse in some basis. This includes the Fourier related bases, for example, the discrete cosine transform ("DCT"), employed by JPEG and wavelets which rely on empirically observed hierarchical self similarity of natural images and underlies the JPEG2000 compression method.

Generalized Sensing

If the signal to be sampled is sparse in some basis, sampling at the Nyquist rate is an inefficient use of resources. Various attempts have been made to leverage this sparsity to reduce the sampling rate. Some techniques use restrictive signal models integrating prior knowledge of the expected structure of the signal to reduce the number of parameters required to be estimated. Adaptive multi-scale sensing uses prior knowledge of the expected multi-scale structure of the signal. This technique, while quite effective in reducing the number of measurements needed, suffers from the requirement of making serial measurements, a characteristic undesirable in imaging fast moving subjects.

Compressive Sensing

A new reduced rate sampling scheme called "compressive sensing" has been developed recently. The goal of compressive sensing reconstruction techniques is the solution of ill-posed inverse problems through the regularization scheme known as "sparsity promotion." Ill-posed inverse problems here are concerned with reconstructing an original signal from a sampled data set of a transform of that signal, where the transform is non-invertible. Sparsity promotion uses prior statistical knowledge of the original signal's sparsity in some basis to search preferentially for solutions of ill-posed inverse problems that are also approximately sparse in that basis. See Candes et al., "Robust uncertainty principles: Exact signal reconstruction from highly incomplete frequency information" (IEEE Trans. on Information Theory, 52(2) pp. 489-509, February 2006), hereby incorporated by reference in its entirety. They showed that a reduced number of non-adaptive samples of an original signal in a sample basis that is incoherent with the basis in which the original signal is sparse is sufficient to recover the signal with little or no information loss. Incoherence here is a measure of dissimilarity between the two bases; more precisely, it is the largest magnitude of the inner product between any pair of basis vectors from the two respective bases. See Candes and Romberg, Sparsity and incoherence in compressive sampling. (Inverse Problems, 23(3) pp. 969-985, 2007). They derived an inverse relationship between the incoherence between the bases and the number of samples required to accurately reconstruct the original signal with high probability. Compressive sensing techniques thus reconstruct the original signal from an underdetermined system of equations through a joint maximization of logical tenability and physical probability.

It was initially thought that $L_0$ norm minimization requiring a computationally prohibitive combinatorial search would be required. Remarkably, it was later shown though that a much more computationally tractable linear programming approach would also work. This approach minimizes the $L_1$ norm of the reconstruction in the sparse basis constrained by the known observations.

Several formulations for solving the inverse problem in compressive sensing have been proposed including "basis pursuit" and constrained and unconstrained convex quadratic programs. See Figueiredo et al., "Gradient projection for sparse reconstruction: Application to compressed sensing and other inverse problems" (IEEE Journal on selected topics in Signal Processing, 2007), hereby incorporated by reference in its entirety.

One formulation consists of an unconstrained convex optimization problem $$\min_x \|y - Ax\|_2^2 + \tau\|x\|_1 \qquad \text{Equation (1)}$$

where x is the solution in the sparse basis, rasterized into a single dimensioned vector, y is the observed image, also rasterized and A is the transformation matrix representing the change in basis from the sparse to the spatial domain. x, being the sparse representation, has fewer elements than y. The first term penalizes deviation from the observed data whereas the second term is an $L_1$ norm that has been shown to penalize less sparse solutions. τ controls the relative weights of the two penalty terms.

Constrained convex optimization problem formulations also exist which minimize just the first or second term while constraining the other below a threshold.

Orthogonal matching pursuit ("OMP") and its many variations such as Simultaneous Orthogonal Matching Pursuit, Staged Matching Pursuit, Expander Matching Pursuit, Sparse Matching Pursuit and Sequential Sparse Matching Pursuit form a popular class of algorithms that obtain an approximate solution quickly. Total variation ("TV") minimization has been shown to produce improved reconstructions. See Candes et al., "Practical signal recovery from random projections" (IEEE Trans. Signal Processing, 2005), hereby incorporated by reference in its entirety. Yet another class of reconstruction algorithm is motivated by de-noising methods and includes iterated thresholding in a transform domain. Subsequent developments continue to further improve reconstruction quality and reduce the computational burden.

Compressive sensing is information scalable, i.e., even if too few samples exist to do an exact reconstruction, various levels of information can be extracted depending on the number of measurements.

As used herein "compressive sensing" (also known as "compressed sensing") means reconstructing a signal using prior statistical knowledge of the original signal's approximate sparsity in some basis to search preferentially for solutions of an ill-posed inverse problem, based on samples of a transform of the original signal, that are also approximately sparse in that basis.

Numerous sparsity promoting solvers are available. A few salient ones are listed below:

GPSR: This solves a bound-constrained quadratic programming formulation using gradient projection algorithms. It is described in Figueiredo, Nowak, Wright, "Gradient projection for sparse reconstruction: Application to compressed sensing and other inverse problems" (IEEE Journal on selected topics in Signal Processing, 2007), hereby incorporated by reference in its entirety, and is currently available at http://www.1x.it.pt/~mtf/GPSR/.

l1-Magic: This solves a "linear programming" or second-order "cone programming" formulation. It is currently available at http://www.acm.caltech.edu/l1magic/ or may be obtained by request from the author Emmanuel Candes, Stanford University Department of Mathematics, 450 Serra Mall, Bldg. 380.

Sparsify: This contains a number of algorithms including several variants of OMP. It is currently available at http://www.personal.soton.ac.uk/tb1m08/sparsify/sparsify.html.

l1_ls: This solves the convex quadratic programming formulation of equation (1) using interior-point methods. It is currently available at http://www.stanford.edu/~boyd/l1s/.

Compressive Imaging

Unfortunately, application of compressive sensing to imaging has suffered from drawbacks. Implementation of arbitrary sampling bases to achieve incoherence with any particular sparse basis would require each measurement to be a linear combination of all pixel values. Since acquiring all pixel values and then computing their linear combinations would defeat the purpose of compressive sensing, techniques have been developed that implement the projection into an arbitrary basis in either the optical domain before being sensed by the photosites or in the analog electrical domain before being digitized.

In one such technique, projection onto a different basis is done using a digital mirror device ("DMD") and multiple samples are acquired serially. See Duarte et al., "Single-pixel imaging via compressive sampling." (IEEE Signal Processing Magazine, 25(2), pp. 83-91, March 2008). Serial measurement is a characteristic undesirable in real-time imaging. Besides the additional cost of a DMD is justifiable only if the savings in sensor cost is significant. This is sometimes the case for detectors measuring beyond the edge of the visible spectrum but typically not for the visible spectrum itself.

Other techniques of implementing the projection into an arbitrary basis in the optical domain include replicating the image multiple times using micro-optomechanical devices or birefringent structures and filtering each replica differently before measurement. See Brady, U.S. Pat. No. 7,532,772, entitled CODING FOR COMPRESSIVE IMAGING. While these techniques do not require serial measurement, the optical processing adds significantly to the cost. Moreover, they do not capture color images.

Another technique discussed in Jacques, L., Vandergheynst, P., Bibet, A., Majidzadeh, V., Schmid, A., and Leblebici, Y., "CMOS compressed imaging by Random Convolution", IEEE International Conference on Acoustics, Speech and Signal Processing (ICASSP), Apr. 19-24, 2009, does random convolutions of the image in the sampling step itself by interconnecting the outputs of various sensor elements electrically, effectively sampling in a basis different from the spatial basis. This affects a non-diagonal transformation in the spatial basis. Besides the cost of specialized hardware to do convolutions in hardware, this scheme suffers from the disadvantage of having to make serial measurements.

Accordingly, there is a need for a method and system for using compressive sensing in image processing in a computationally feasible, practical and economical way.

BRIEF SUMMARY OF THE INVENTION

The present invention provides a method for processing an image. In the method, a sample set of data generated by transforming and sampling an optical property of an original image in a spatial basis, wherein the transformation effected is substantially diagonal in the spatial basis is received. A compressive sensing reconstruction technique is applied to the sample set of data to produce a set of inferred original image data.

In addition, an image sensor having a plurality of photosensitive sensor elements may be provided, along with an optical transform having a plurality of transformation elements responsive to the optical property, wherein the transformation effected by the optical transform is substantially diagonal in the spatial basis. In this case, the image is projected onto the optical transform, and the optical responses of the transformation elements are sensed at the image sensor to the original image to produce the sample set of data.

The present invention also provides a system for processing an image. The system comprises a data processing apparatus adapted to receive a sample set of data generated by transforming and sampling an optical property of an original image in a spatial basis, wherein the transformation effected is substantially diagonal in the spatial basis. It then applies a compressive sensing reconstruction technique to the sample set of data to produce a set of inferred original image data.

The system may further comprise an image sensor having a plurality of photosensitive sensor elements; an optical transformation device having a plurality of transformation elements responsive to the optical property wherein the transformation effected by the optical transform is substantially diagonal in the spatial basis; and an optical imaging device adapted to project the image onto the optical transformation device, the image sensor being disposed with respect to the optical transform so as to receive the optical responses of the transformation elements to the image at the photosensitive elements corresponding thereto to produce the sample set of data.

One preferred embodiment of the present invention combines a color filter array with colors arranged randomly or pseudo-randomly with an image reconstruction technique based on compressive sensing that achieves the same limiting image resolution in each color as a monochrome image sensor using the same number of sensor elements.

It is to be understood that this summary is provided as a means of generally determining what follows in the drawings and detailed description, and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 5 lists a portion of Matlab code for producing a random color filter array suitable for use in a preferred embodiment of the present invention.

DETAILED DESCRIPTION OF THE INVENTION

Figure 1:
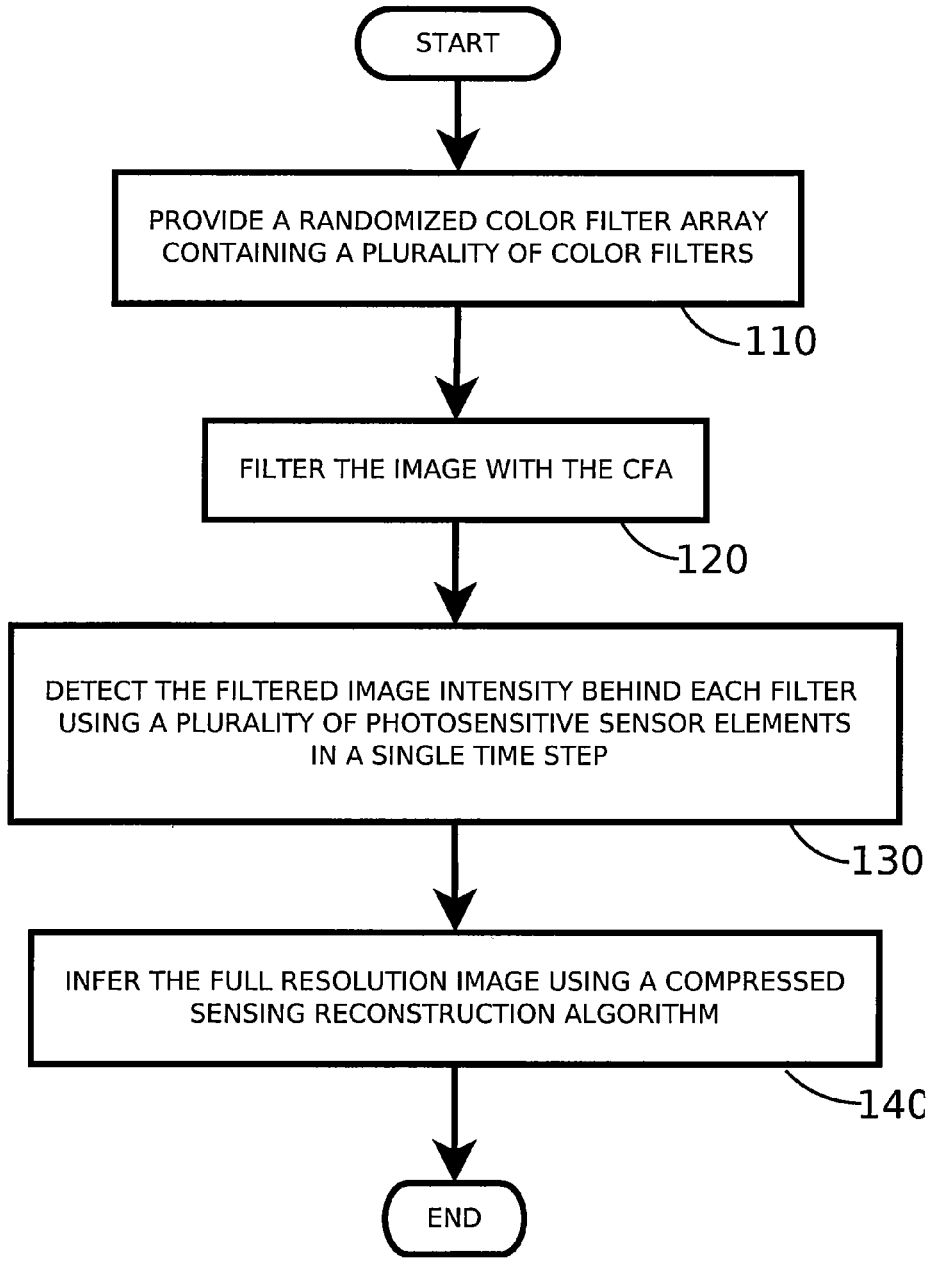
FIG. 1 is a flowchart showing a method for sampling and reconstructing a color image using compressive sampling in accordance with a preferred embodiment of the present invention.

To overcome the limitations of prior art compressive imaging methods and systems, the present invention uses the spatial basis directly as the sampling basis. This direct spatial sampling is distinct from the previously mentioned existing techniques of image sampling because, among other things, it samples the image after applying a transformation, such as color filtering, that is substantially diagonal in the spatial basis, i.e., the transformed value at each location depends on the original image at that location only, not at locations substantially removed from it to achieve incoherence between the measurement and sparse bases. This works well since the spatial basis is already highly incoherent with the Fourier related bases in which natural signals are approximately sparse. This choice also does not suffer from the previously mentioned drawback of having to make multiple measurements serially as all measurements are obtained simultaneously, each measurement being simply the output of an individual sensor element. Note that optical elements that affect transformations that are non-diagonal in the spatial basis such as optical low pass filters are allowed in the pipeline, but the original image—the image we aim to reconstruct using compressed sensing techniques—is defined herein as the image produced after such filters have been applied. Moreover such elements are not used for the purpose of incoherence enhancement.

In the case of a monochrome image sensor, the naive design of choosing a sensor array with fewer sensor elements arranged in a regular pattern does not offer the advantages of compressive sensing: the maximum spatial frequencies of such image sensors is limited by their reduced Nyquist frequencies. Frequencies beyond the Nyquist limit cannot be inferred since the random projections of these frequencies in the spatial measurement basis cannot be distinguished from those of their aliases. In contrast, a regular monochrome image sensor with a few randomly or pseudo-randomly chosen sensor elements turned off can still provide enough information to reconstruct the image at full resolution with little or no loss of quality. While this does not lead to a reduction in sensor area, it does reduce the read-out rate. This forms an embodiment of the present invention.

The preferred embodiment of the present invention uses the sparse sensor elements in the monochrome image sensor described above to pack three basic colors into an image sensor with the same number of sensor elements as a monochrome image sensor and still obtain the same limiting resolution in each color as the monochrome sensor. Approximately equal numbers of filter elements in each of the basic colors, arranged randomly are used to multiplex the basic colors.

Another embodiment uses panchromatic filter elements wherein each element is transmissive to varying degrees in all basic colors. Here, the color compositions, not just their distribution are randomly chosen. However, such CFAs are harder to manufacture than CFAs in basic colors.

Another embodiment uses filters of basic colors but with different transmittivity, or augments the CFA with a few non-basic colors or clear filters. This is done to improve sensitivity or the dynamic range of the resulting sensor.

A flowchart showing a preferred method of compressive imaging is shown in FIG. 1. In step 110, a CFA is provided with colors arranged randomly or pseudo-randomly. (As used herein the term "randomly" is to be construed as including psuedo randomly as well as randomly. In step 120, the incident image is filtered through this CFA. In step 130, the filtered image is detected by an image sensor in a single measurement period. In step 140, the full resolution image is reconstructed from the image sensor output and the CFA pattern using compressive sensing sparse signal reconstruction techniques.

Figure 2:
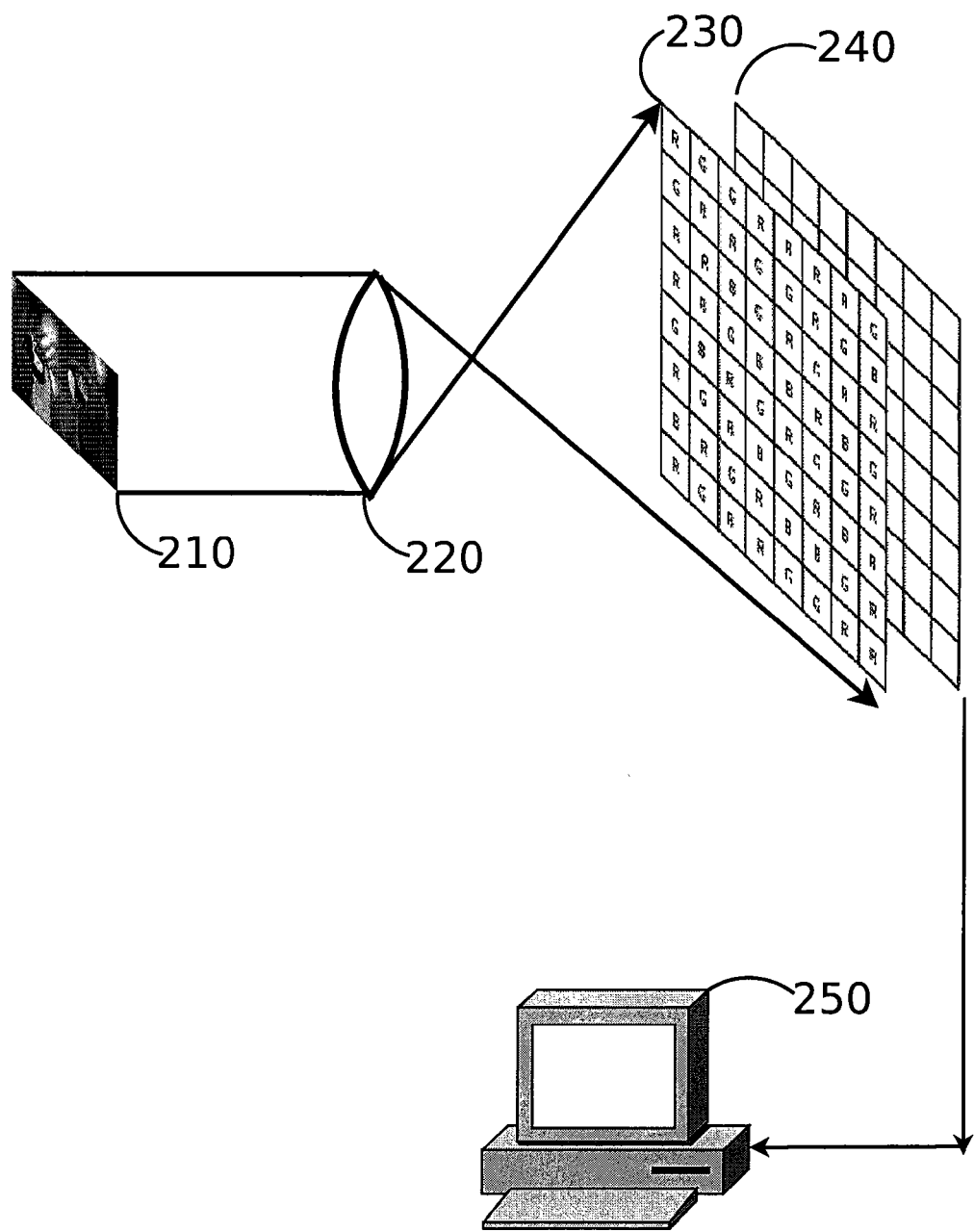
FIG. 2 is a schematic diagram of a color imaging system in accordance with a preferred embodiment of the present invention.

A schematic diagram of an imaging system in accordance with the preferred embodiment of the present invention is shown in FIG. 2. Image 210 is focused by lens 220 onto an optical transformation device, specifically CFA 230 (As used herein, the term "optical transformation device" means a device, such as a fixed color filter or a spatial light modulator that transforms an optical image from one state to another based on one or more optical properties of the image.). The filtered image is detected by image sensor 240. The resulting plurality of sensed filtered image intensity values is sent to processor 250, which implements the algorithm of FIG. 1, where full resolution image reconstruction is performed.

Figure 3:
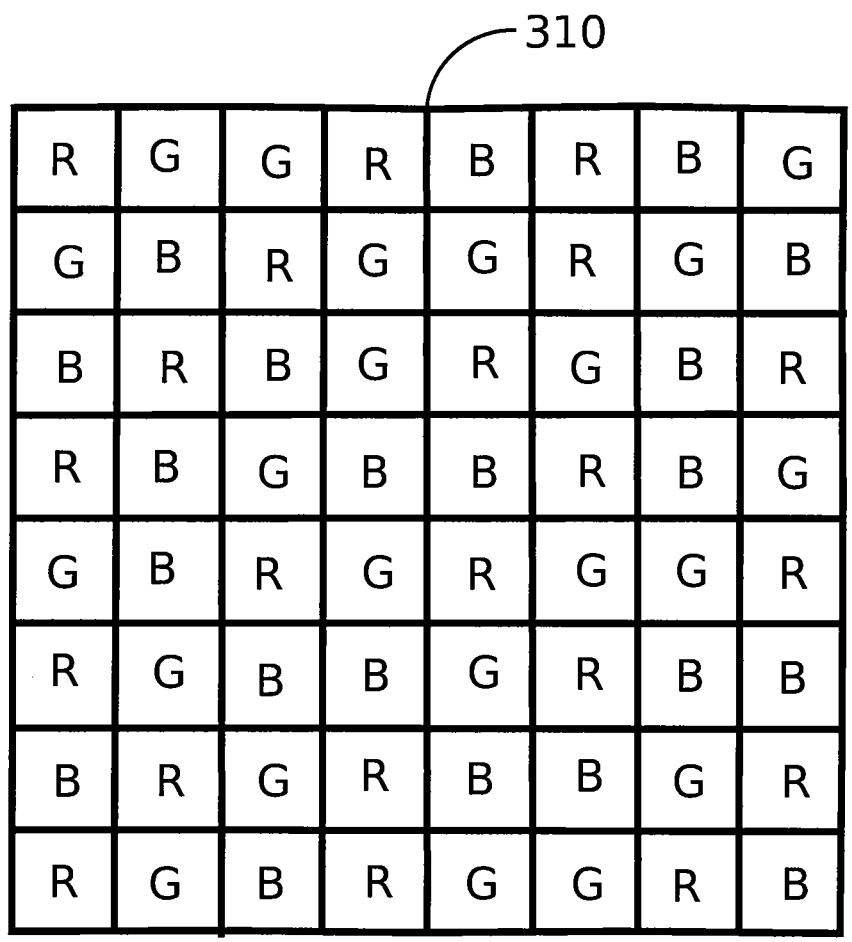
FIG. 3 is a diagram of a color filter array in accordance with the preferred embodiment of the present invention.

An exemplary CFA 310 in accordance with a preferred embodiment of the present invention is shown in FIG. 3. In this example red, green and blue (collectively "RGB") filters in approximately equal numbers are distributed in a randomized pattern.

A Matlab simulation was performed wherein a CFA with approximately equal numbers of red, green and blue filters arranged in a randomized pattern was generated. Matlab Code for generation of such a CFA is shown in FIG. 5. The original color image was filtered through this CFA, a certain amount of white noise was added to the filtered image and reconstruction was performed on the resultant image sensor output. The 2D discrete cosine transform ("DCT") basis was used as the sparse basis. The GPSR solver was used to perform signal reconstruction. The GPSR solver solves the formulation of Equation (1), shown above, by converting it into an equivalent bound-constrained quadratic programming formulation and then using gradient projection algorithms to solve it, as will be understood by a person having ordinary skill in the art. The simulation resulted in a color image with the same resolution in each color as a conventional monochrome sensor produces with the same number of sensor elements was obtained albeit with a little loss of image quality. The Matlab code for performing this simulation is listed at the end of this Detailed Description of the Invention.

Figure 4:
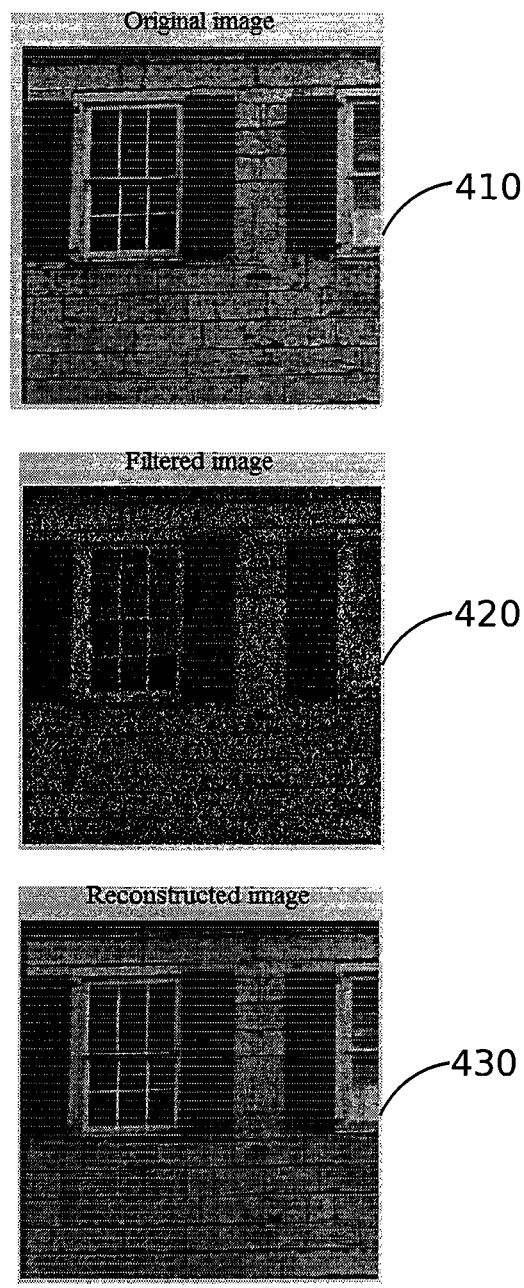
FIG. 4 shows the results of a simulation of color image sampling and reconstruction using compressive sampling in accordance with the preferred embodiment of the present invention as carried out in Matlab.

FIG. 4 shows the results of this simulation. Image 410 is the original color image. Image 420 is the original image after being filtered by an exemplary randomized RGB filter. Image 430 is the reconstructed full resolution color image. The color images are provided here in greyscale.

FIG. 5 lists Matlab code used in the simulation of a simple embodiment of the present invention. The Matlab code for generating the CFA should be sufficient for anyone of ordinary skill in the art to reproduce these results using the GPSR solver. Matlab is a product of The Math Works, Inc., Natick, Mass., U.S.A.

The present compressive sensing imaging design enables integration of compression in the image acquisition layer. This reduces the data transfer requirements off of the focal plane—which is the interface between the optical field and digitized data—and enables image sensor designs with reduced photosite count. This also enables lower power, lower bandwidth image sensor designs.

As previously described, the present invention uses the spatial basis as the measurement basis, exploiting its incoherence with natural images' sparse bases to effectively achieve compressive sensing. This enables the reduction in samples required to reconstruct the image in each color, which, in turn, allows sampling in the three colors to be multiplexed together. This system can be augmented with various modifications to the reconstruction technique to improve image quality.

Correlations between the images in the three basic colors can be leveraged to express the image in a joint basis in which natural images are more sparse than synthetic ones. See Nagesh et al., "Compressive imaging of color images" (IEEE Int. Conf. on Acoustics, Speech and Signal Processing (ICASSP), Taipei, Taiwan, April 2009), hereby incorporated by reference in its entirety. The joint basis refactors the image in the basic colors in the sparse basis into a part that is common to all colors and color specific parts.

As mentioned previously, TV minimization produces better results than just $L_1$ minimization. TV is a gradient based smoothing functional. See Candes et al, "Practical signal recovery from random projections" (IEEE Trans. Signal Processing, 2005), hereby incorporated by reference in its entirety (IBR). Total Variation minimization is implemented in the NESTA solver described in S. Becker, J. Bobin, and E. J. Candès, "NESTA: a fast and accurate first-order method for sparse recovery," In Press, SIAM J. on Imaging Sciences, hereby incorporated by reference in its entirety, currently available at http://www.acm.caltech.edu/~nesta/ or by request from the authors.

A conventionally demosaiced image can be used as the starting point for the solvers. This demosaicing for randomized CFA patterns can be performed using different methods including ones described in Condat, "Random patterns for color filter arrays with good spectral properties" (Research Report of the IBB, Helmholtz Zentrum Munchen, no. 08-25, September 2008, Munich, Germany), IBR, hereby incorporated by reference in its entirety and in Lukac et al., "Universal demosaicing for imaging pipelines with a RGB color filter array" (Pattern Recognition, vol. 38, pp. 2208-2212, 2005) IBR, hereby incorporated by reference in its entirety. Using these as a starting point for image reconstruction can speed up the reconstruction process and, in some implementations, possibly improve the quality of the reconstruction itself. The demosaiced image can also be used as a preview of the image prior to reconstruction of the full resolution image.

Other CFA patterns can be used. These patterns can be based in different color spaces, i.e., use different sets of basic colors instead of the primary colors red, green and blue.

CFA patterns with unequal numbers of the basic colors can be used. For example twice as many green sites may be employed as red or blue as is done in the Bayer CFA. Such asymmetries can be useful in reducing noise.

CFA patterns with certain restrictions on the distribution of the colors such as those discussed in Condat, "Random patterns for color filter arrays with good spectral properties" (Research Report of the IBB, Helmholtz Zentrum Munchen, no. 08-25, September 2008, Munich, Germany), IBR, hereby incorporated by reference in its entirety, may be used. Such restrictions can help avoid excessive clumping of filter elements of identical color while still maintaining the random character of the CFA pattern.

Other wavelet, fractal or curvelet bases or combinations thereof can be used as the sparse basis. When choosing a sparse basis, the advantage of choosing a basis in which natural images are more sparse has to be balanced against the possible disadvantage of that basis' low incoherence with the spatial measurement basis. Experimentation with the Daubechies wavelets as the sparse basis instead of the 2D DCT basis resulted in visually similar reconstruction.

Sensor readings suffer from Poissonian photon-shot noise and Gaussian noise from thermal and electrical sources. Reconstruction algorithms that include a log likelihood penalty term for these distributions can extract the original noise-free signal more accurately. SPIRAL (described in Zachary T. Harmany, Roummel F. Marcia, and Rebecca M. Willett, "This is SPIRAL-TAP: Sparse Poisson Intensity Reconstruction ALgorithms—Theory and Practice" (Submitted to IEEE Transactions on Image Processing) and currently available from http://people.ee.duke.edu/~zth/software/ or by request from the authors, hereby incorporated by reference in its entirety) is one such solver that can use penalty terms based on the negative log likelihood of Poissonian distributions in addition to sparsity promoting $L_1$ and Total Variation terms.

Another constraint which is statistically linked to natural images is the likelihood of large wavelet coefficients to be at coarser scales. This may be leveraged in the reconstruction process if wavelets are chosen as the sparse basis. Similarly the increased likelihood of large amplitudes to be at lower frequencies in the Fourier transform of natural and most synthetic images can also be leveraged in the reconstruction process.

Image reconstruction at reduced limiting resolutions of luminance or chrominance or both or of one or more basic colors may result in better image quality.

The present invention may be used not just for still imaging but for video as well. Besides a trivial extension to multiple frames, algorithms that perform joint reconstruction of multiple frames leveraging their correlation may also be used.

Instead of just color images in the visual spectrum, the present invention may also be used in other situations where multi-spectral image sensor systems are limited by geometric constraints. The present invention allows multi-spectral sampling to be folded into smaller sensors requiring smaller apertures without increased acquisition times.

The present invention provides greater immunity to image quality against dead or malfunctioning sensor elements. This can be used to improve sensor yields: Image sensors with a few dead sensor elements need not be discarded, just characterized.

The present invention may be used in image scanners.

The present invention may be used in acquiring multi-spectral images in different number of dimensions including 1D and 3D.

The following is Matlab code used to produce the simulated results shown in FIG. 4.

```
f = double(imread('pic.tif'));
% Simulate Low Pass filtering by an ideal OLPF
r=0.7;
for k=1: 3
    B(:,:,k) = idct2(Lpf(dct2(f(:,:,k)), r));
end
f = B;
[m n c] = size(f);
scrsz = get(0,'ScreenSize');
figure(1)
set(1,'Position',[0 scrsz(4)*0.05 scrsz(3)/1 0.3*scrsz(4)])
subplot(1,3,1)
imagesc(uint8(f))
axis off
axis equal
title('Original image','FontName','Times','FontSize',14)
CFA = zeros(3*m, n);
rnd = randn(m, n);
for i=1: m
    for j=1: n
        if rnd(i, j) < −0.4307
            CFA(i, j) = 1;
        else if rnd(i, j) < 0.4307
            CFA(m+i, j) = 1;
        else
            CFA(m+m+i, j) = 1;
        end
        end
    end
end
% define the function handles that compute
% the filtering and the conjugate filtering.
R = @(x) CFA.*x;
RT = @(x) CFA.*x;
% define the function handles that compute the transformation
% of the image to the sparse domain (WT) and its transpose (W)
W = @(x)FilteredIDct(x);
WT = @(x)FilteredDct(x);
%Define the function handles that compute
% the products by A = RW and A' = W'R'
A = @(x) R(W(x));
AT = @(x) WT(RT(x));
tallf = [f(:,:,1); f(:,:,2); f(:,:,3)];
% generate noisy filtered observations
sigma = 4*sqrt(2);
y = R(tallf) + sigma*randn(size(tallf));
f_noisy = f + sigma*abs(randn(size(f)));
[MAE, MSE, PSNR]=Metrics(f, f_noisy);
fprintf('MAE=%f, MSE=%f, PSNR=%f\n', MAE, MSE, PSNR);
tau = .3; % regularization parameter
tolA = 1.e−6;
[theta,theta_debias,obj_QP_BB_mono,times_QP_BB_mono,...
    debias_start,mses_QP_BB_mono]= ...
    GPSR_BB(y,A,tau,...
    'AT', AT,...
    'Debias',1,...
    'Initialization', AT(y),...
    'True_x',WT(tallf),...
    'Monotone',1,...
    'ToleranceA',tolA);
filteredPic = uint8(zeros(size(f)));
for k=1:c
    filteredPic(:,:,k) = uint8(y((k−1)*m+1:k*m,:));
end
% ===== Plot results =====
figure(1)
subplot(1,3,2)
imagesc(filteredPic)
axis off
axis equal
title('Filtered image','FontName','Times','FontSize',14)
figure(1)
subplot(1,3,3)
pic = double(zeros(size(f)));
if prod(size(theta_debias))~=0
    tallPic = W(theta_debias);
else
    tallPic = W(theta);
end
for k=1: c
    pic(:,:,k) = tallPic((k−1)*m+1:k*m,:);
end
[MAE, MSE, PSNR]=Metrics(f, pic);
fprintf('MAE=%f, MSE=%f, PSNR=%f\n', MAE, MSE, PSNR);
pict = uint8(pic);
imagesc(pict)
axis off
axis equal
title('Reconstructed image','FontName','Times','FontSize',14)
function Y = Lpf(X, r)
A = fftshift(X);
r = r*size(A, 1)/2;
r2 = r*r;
alpha = size(A,1)/size(A,2);
alpha2 = alpha*alpha;
for i=1:size(A, 1)
    for j=1:size(A, 2)
        if (i−size(A,1)/2−1)^2+ alpha2*(j−size(A, 2)/2−1)^2 > r2
            A(i, j) = 0;
        end
    end
end
Y = fftshift(A);
function S= FilteredDct(x)
m = size(x, 1)/3;
S = [Lpf(dct2(x(1:m,:)),0.65); Lpf(dct2(x(m+1:2*m,:)),r);
Lpf(dct2(x(2*m+1:3*m,:)),0.65)];
End
function x= FilteredIDct(s)
m = size(s, 1)/3;
x = [idct2(Lpf(s(1:m,:),0.65)); idct2(Lpf(s(m+1:2*m,:),r));
idct2(Lpf(s(2*m+1:3*m,:),0.65))];
end
function [MAE, MSE, PSNR] = Metrics(A, B)
```

-continued

```
E=abs(B−A);
E=[E(:)];
MAE=sum(E)/size(E,1);
E=E.^2;
MSE=sum(E)/size(E,1);
PSNR=10*log10(255^2/MSE);
```

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The terms and expressions that have been employed in the foregoing specification are used therein as terms of description and not of limitation, and there is no intention, in the uses of such terms and expressions, to exclude equivalents of the features shown and described or portions thereof, it being recognized that the scope of the invention is defined and limited only by the claims which follow.

What is claimed is:

1. A method for processing an image, comprising:
   receiving a sample set of data generated by transforming and sampling an optical property of an original image in a spatial basis, each sample of the sample set of data being a scalar value obtained from an individual optical sensing element, wherein the transformation effected is substantially diagonal in the spatial basis, though not necessarily diagonal in the spatial domain, so that said transformation has a substantially non-dispersed point spread function; and
   applying a compressive sensing reconstruction technique to the sample set of data to produce a sparse representation of the original image data in a basis which is substantially incoherent with the sampling basis.

2. The method of claim 1, further comprising
   providing an image sensor having a plurality of photosensitive sensor elements;
   providing an optical transformation device having a plurality of transformation elements responsive to the optical property;
   projecting the image onto the optical transformation device; and
   sensing at the image sensor the optical responses of the transformation elements to the original image to produce the sample set of data.

3. The method of claim 2, wherein providing an optical transformation device comprises providing an optical filter array having a plurality of filter elements.

4. The method of claim 3, wherein providing an optical filter array includes providing at least two sets of the filter elements that exhibit different responses to color.

5. The method of claim 4, wherein providing the optical filter elements include providing them arranged in a random color pattern satisfying at least one predetermined distribution condition.

6. The method of claim 3, wherein the optical filter array is provided with filter elements responsive to one of several basic colors, the filter elements are arranged in a random color pattern, and inferred original image data is produced in all of the basic colors.

7. The method of claim 6, wherein the optical filter array is provided with filter elements having a one-to-one relationship to substantially all the sensor array elements, each such being responsive to one of the basic colors, the filter elements are arranged in a random color pattern satisfying at least one predetermined distribution condition, and inferred original image data is produced in all of the basic colors.

8. The method of claim 3, wherein the optical filter array is provided with filter elements responsive to randomly composed panchromatic colors, the filter elements are arranged in a random pattern, and inferred image data is produced along all axes of a suitable color space.

9. The method of claim 3, wherein the optical filter array is provided with a pattern of randomly arranged transmissive or opaque filter elements.

10. The method of claim 2, wherein one or more of the sensor elements of the image sensor is defective.

11. The method of claim 2, wherein multiple, sequential sample sets of data are produced from which multiple, sequential sets of corresponding inferred original image data are produced.

12. The method of claim 1, wherein the optical property is the intensity of one of several colors sampled in a random color pattern, and inferred original image data is produced in all of the basic colors.

13. The method of claim 1, wherein the optical property is the intensity of one of several panchromatic colors sampled in a random color pattern, and inferred image data is produced along all axes of a suitable color space for each inferred original image data element.

14. The method of claim 1, wherein the optical property is intensity.

15. A system for processing an image, comprising:
    a data processing apparatus adapted to:
    receive a sample set of data generated by transforming and sampling an optical property of an original image, each sample of the sample set of data being a scalar value obtained from an individual optical sensing element, wherein the transformation effected is substantially diagonal in the spatial basis, though not necessarily diagonal in the spatial domain, so that said transformation has a substantially non-dispersed point spread function; and
    apply a compressive sensing reconstruction technique to the sample set of data to produce a sparse representation of the original image data in a basis which is substantially incoherent with the sampling basis.

16. The system of claim 15, further comprising
    an image sensor having a plurality of photosensitive sensor elements;
    a optical transformation device having a plurality of transformation elements responsive to the optical property; and
    an optical imaging device adapted to project the image onto the filter array, the image sensor being disposed with respect to the optical transformation device so as to receive the optical responses of the transformation elements to the image at the photosensitive elements corresponding thereto to produce the sample set of data.

17. The system of claim 16, wherein the optical transformation device comprises an optical filter array having a plurality of filter elements.

18. The system of claim 17, wherein at least two sets of filter elements exhibit different responses to color.

19. The system of claim 18, wherein the optical filter elements are arranged in a random color pattern satisfying at least one predetermined distribution condition.

20. The system of claim 17, wherein the filter elements are responsive to one of a several basic colors and are arranged in a random color pattern, and inferred original image data is produced in all of the basic colors.

21. The system of claim 20, wherein the filter elements have a one-to-one relationship to substantially all the sensor array elements, are each responsive to one of a finite number of colors, and are arranged in a random color pattern satisfying at least one predetermined distribution condition, and the inferred original image data is produced in all of the basic colors.

22. The system of claim 17, wherein the filter elements are responsive to randomly composed panchromatic colors and are arranged in a random pattern, and inferred image data is produced along all axes of a suitable color space corresponding to each sensor element.

23. The system of claim 17, wherein the filter elements are randomly arranged transmissive or opaque filter elements.

24. The system of claim 16, wherein one or more of the sensor elements of the image sensor is defective.

25. The system of claim 16, wherein the sensor produces multiple, sequential sample sets of data are from which the processing apparatus produces multiple, sequential sets of corresponding inferred original image data.

26. The system of claim 15, wherein the optical property is the intensity of basic colors sampled in a random color pattern satisfying at least one predetermined distribution condition, and the data processing apparatus is adapted to produce inferred original image data in all of the basic colors.

27. The system of claim 15, wherein the optical property is the intensity of one of a finite number of panchromatic colors sampled in a random color pattern satisfying at least one predetermined distribution condition, and the data processing apparatus is adapted to produce inferred image data along all axes of a suitable color space for each inferred original image data element.

28. The system of claim 15, wherein the optical property is intensity.

* * * * *